United States Patent [19]

Sakai et al.

[11] Patent Number: 5,777,560
[45] Date of Patent: Jul. 7, 1998

[54] RADIO PAGING SYSTEM FOR SELECTIVE TRANSMISSION WITHOUT A SEPARATE ADDRESS FOR EACH PAGING AREA

[75] Inventors: Tsutomu Sakai; Setsuya Ohashi, both of Yokohama; Takayuki Mizuki, Tokyo, all of Japan

[73] Assignee: NTT Mobile Communications Network Inc., Tokyo, Japan

[21] Appl. No.: 585,316

[22] Filed: Jan. 11, 1996

Related U.S. Application Data

[63] Continuation of PCT/JP95/00879, May 9, 1995.

[30] Foreign Application Priority Data

May 10, 1994 [JP] Japan ................... 6-096725

[51] Int. Cl.$^6$ .................................................. H04Q 7/18
[52] U.S. Cl. ................ 340/825.44; 340/825.47; 340/825.52; 340/311.1; 455/456; 455/432; 455/458; 370/312; 370/313
[58] Field of Search .................... 340/825.44, 825.47, 340/825.52, 825.69, 825.49, 311.1; 455/456, 432, 458, 426, 433, 435, 32.1, 526, 517, 575; 370/310, 312, 313

[56] References Cited

U.S. PATENT DOCUMENTS

| 4,897,835 | 1/1990 | Gaskill et al. | 340/825.44 X |
| 5,111,197 | 5/1992 | Ichikawa | 340/825.44 |
| 5,254,986 | 10/1993 | Deluca | 340/825.44 |
| 5,357,561 | 10/1994 | Grube | 455/456 |
| 5,600,312 | 2/1997 | Willard et al. | 340/825.44 X |

FOREIGN PATENT DOCUMENTS

| 63-109619 | 5/1988 | Japan . |
| 63-146525 | 6/1988 | Japan . |
| 64-27328 | 1/1989 | Japan . |

*Primary Examiner*—Brian Zimmerman
*Assistant Examiner*—William H. Wilson, Jr.
*Attorney, Agent, or Firm*—Cushman Darby & Cushman IP Group of Pillsbury Madison & Sutro LLP

[57] ABSTRACT

When a transmit station pages a pager which has the paging area of that transmit station as its local area, it pages using an address which is unique in that area. When a pager with another local area has moved into this paging area and is paged, it is paged using the area identification number of its local area and the address of its receiver. Each pager can therefore be paged in any given paging area without having to be given a separate address for each paging area.

7 Claims, 7 Drawing Sheets

Prior Art

Operation of Paging Terminal

FIG. 3

Operation of Transmit Station

FIG. 4

Operation of Pager

FIG. 5

FIG. 6 (a)
Example of configuration of paging signals transmitted from transmit station 12 of paging area 11

FIG. 6 (b)
Example of configuration of paging signals transmitted from transmit station 22 of paging area 21

FIG. 6 (c)
Example of configuration of paging signals transmitted from transmit station 32 of paging area 31

| Bit No. | 1 | 2~19 | 20,21 | 22~31 | 32 |
|---|---|---|---|---|---|
| Address Code Word | "0" | Address Bits | Function Bits | Check Bits | * |
| Massage Cord Word | "1" | Massage Bits | | Check Bits | * |

* : Even Parity Bits

ITU−R Recommendation Rec.584"Radio Paging Code No.1"

Address Cord Word | Massage Cord Word

"0" | Address IDA | "0,0" | Check Bits | * | "1" | message Bits | Check Bits | * | "1"

Address Bits Function Bits Nos.2-19 Bits (18 Bits) Bits Nos. 20, 21

→ Message Information

FIG. 8 (b)

First Address Cord Word | Second Address Cord Word

"0" | Area ID Number Nb | "1,0" | Check Bits | * | "0" | Address IDB | "1,1" | Check Bits | * | ↦

Address Bits Function Bits Nos.2-19 Bits (18 Bits) Bits Nos. 20, 21

Address Bits Function Bits Nos.2-19 Bits (18 Bits) Bits Nos. 20, 21

Message Information

FIG. 8 (c)

First Address Cord Word | Second Address Cord Word

"0" | Area ID Number Nc | "1,0" | Check Bits | * | "0" | Address IDC | "1,1" | Check Bits | * | ↦

Address Bits Function Bits Nos.2-19 Bits (18 Bits) Bits Nos. 20, 21

Address Bits Function Bits Nos.2-19 Bits (18 Bits) Bits Nos. 20, 21

Message Information

RADIO PAGING SYSTEM FOR SELECTIVE TRANSMISSION WITHOUT A SEPARATE ADDRESS FOR EACH PAGING AREA

This is a Continuation of International Appln. No. PCT/JP95/00879 filed May 9, 1995 which designated the U.S.

BACKGROUND OF THE INVENTION

1. Field of the Invention

This invention relates to a radio paging system which selectively transmits paging signals to pagers from transmit stations, and which lets the users of pagers know that they have been paged. In particular, it relates to an extension of the service area whereby a pager can be utilized after it has moved to another paging area.

2. Description of Related Art

As examples of technology whereby a pager can be paged even after it has moved to another paging area, both Jap. Pat. Pub. No. 1-13253 and Jap. Kokai Pat. No. 1-97026 disclose paging in a new paging area after performing location registration in that area. Furthermore, technology for transferring paging requests is disclosed in Jap. Kokai Pat. No. 1-231437 and Jap. Kokai Pat. No. 2-67024.

Figure 1:
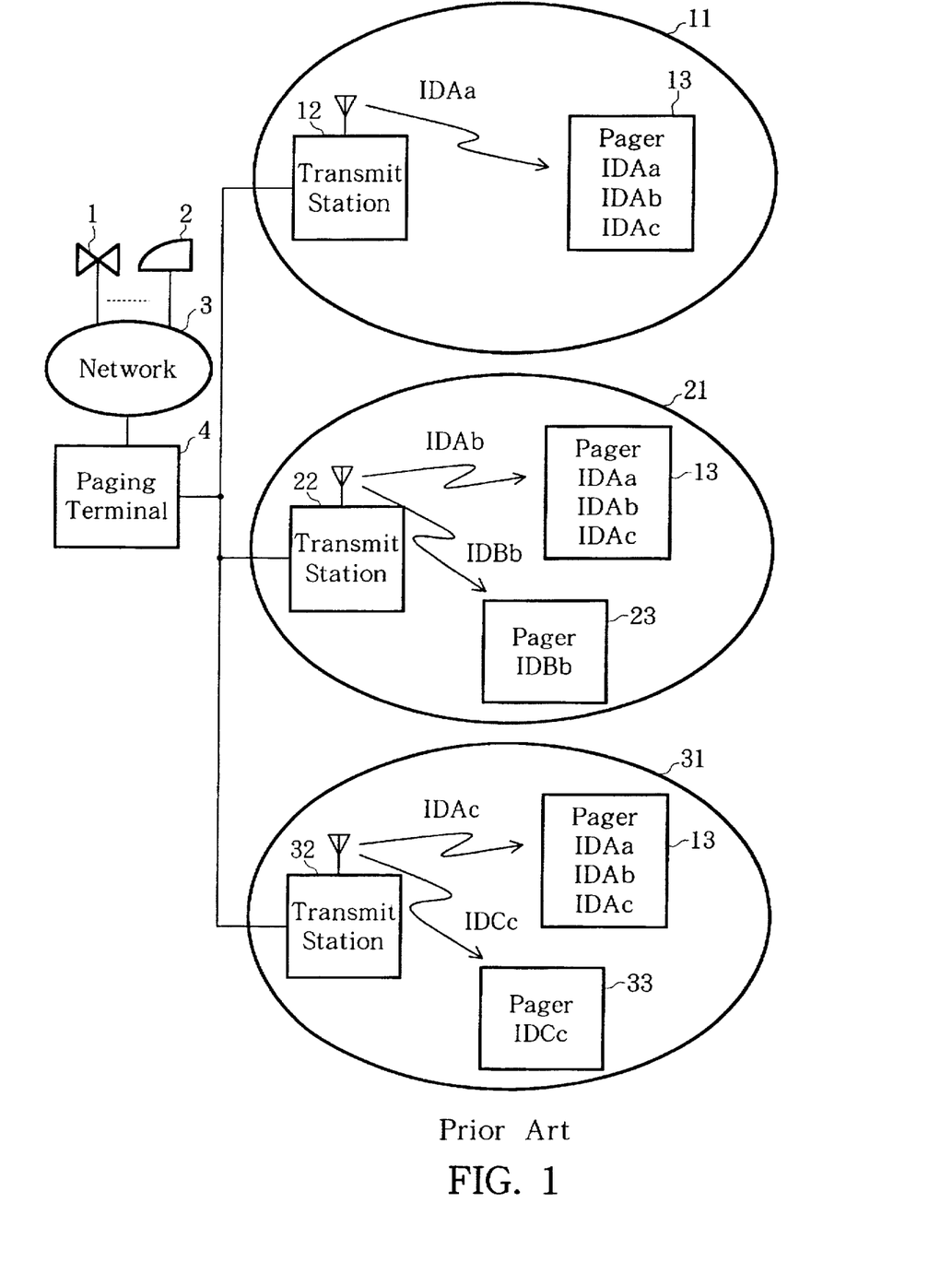
FIG. 1 is a block diagram showing a prior art radio paging system.

FIG. 1 is a block diagram serving to explain the prior art radio paging system taught in Jap. Kokai Pat. No. 1-97026. In this example of the prior art, paging terminal 4 is connected to network 3, to which communication terminals 1 and 2 are also connected. Transmit stations 12, 22 and 32 are connected to this paging terminal 4. Transmit stations 12, 22 and 32 form paging areas 11, 21 and 31 respectively. Pager 13, which can be paged in a plurality of paging areas, is provided beforehand with a different address IDAa, IDAb and IDAc for each paging area 11, 21 and 31. The user of pager 13 has to make sure that the area of current location is always registered with paging terminal 4 via network 3.

When pager 13 is paged in paging area 11, address IDAa is transmitted from transmit station 12 as part of a paging signal. Pager 13 detects that the address IDAa is contained in the paging signal and performs paging. When pager 13 has moved to paging area 21 or paging area 31, its location is registered, and subsequently address IDAb or IDAc is transmitted from transmit station 22 or 32 as part of a paging signal, whereupon pager 13 detects that the address IDAb or IDAc is contained in the paging signal and performs paging.

On the other hand, pager 23 in paging area 21 has been given address IDBb only, and pager 33 in paging area 31 has been given address IDCc only. Thus, pager 23 and pager 33 can only be paged in paging area 21 or paging area 31, respectively. In order to be paged in a paging area other than these paging areas, they would have to be assigned an address for that paging area.

However, a problem which has been encountered with this prior art system is that a pager which is to be paged in a plurality of paging areas has to be given an address for each paging area beforehand, and it cannot be paged in a paging area for which no address has been given.

The object of this invention is to provide a radio paging system which solves this problem, and which makes it unnecessary to give an address for each paging area, and which enables paging to be carried out in any given paging area.

SUMMARY OF THE INVENTION

A radio paging system according to this invention includes: a plurality of transmit stations each of which transmits radio signals containing paging signals to its own paging area in response to calls that have arrived from a network and one or more pagers which receive the radio signals respectively transmitted by the plurality of transmit stations. Each of the pagers produces a paging signal output when it detects that its own address is contained in the paging signals. The radio paging system being are characterized in that: an area identification number is assigned to each paging area, and each pager is set one paging area as its local area, and a unique address is assigned to each pager in its local area. Each transmit station contains a means which, when it pages a pager which has the paging area of that transmit station as its local area, transmits the address of that pager, and which, when it pages a pager which has another paging area as its local area, transmits the area identification number of the paging area which is the local area of that pager, together with the address of that pager. Each pager contains a means which, when it receives a paging signal in its own local area, detects that its own address is contained in that paging signal without an accompanying area identification number, and when it receives a paging signal in another paging area, detects that the area identification number of its own local area and its own address are both contained in that paging signal.

In order to implement this invention, it is at least necessary that each pager recognizes the paging area in which it is located. A transmit station should therefore include a means which transmits, separately from the paging signal, a control signal for identifying its own paging area. Each pager should include a means which decides, on the basis of this control signal, whether or not that paging area is its own local area.

In order to make effective use of radio signals, it is desirable for a transmit station to transmit radio signals containing paging signals only to pagers located in its own paging area. It is therefore desirable to provide a paging terminal at which the location of each pager is registered via a public network, and for this paging terminal to include a means which transfers calls from the network for any given pager to the transmit station serving the location at which said pager is registered. When it does so, in order to identify the pager being called, it should notify the transmit station of the address of the pager in question and of the area identification number of its local area. The transmit station should remove the area identification number from any paging signal that contains the area identification number of the paging area of the transmit station. Area identification numbers can also be removed at the paging terminal.

In the present invention, when a transmit station pages a pager which has the paging area of that transmit station as its local area, the transmit station pages using an address which is unique in that area. When a pager with another local area has moved into this paging area and is paged, it is paged using the area identification number of its local area plus the address of its receiver. Each pager can therefore be paged in any given paging area without having to be given a separate address for each paging area. Even though addresses are given independently in each paging area, paging signals for other pagers will not be duplicated in any given paging area, and it becomes easier to give and manage addresses.

DETAILED DESCRIPTION OF THE INVENTION

Figure 2:
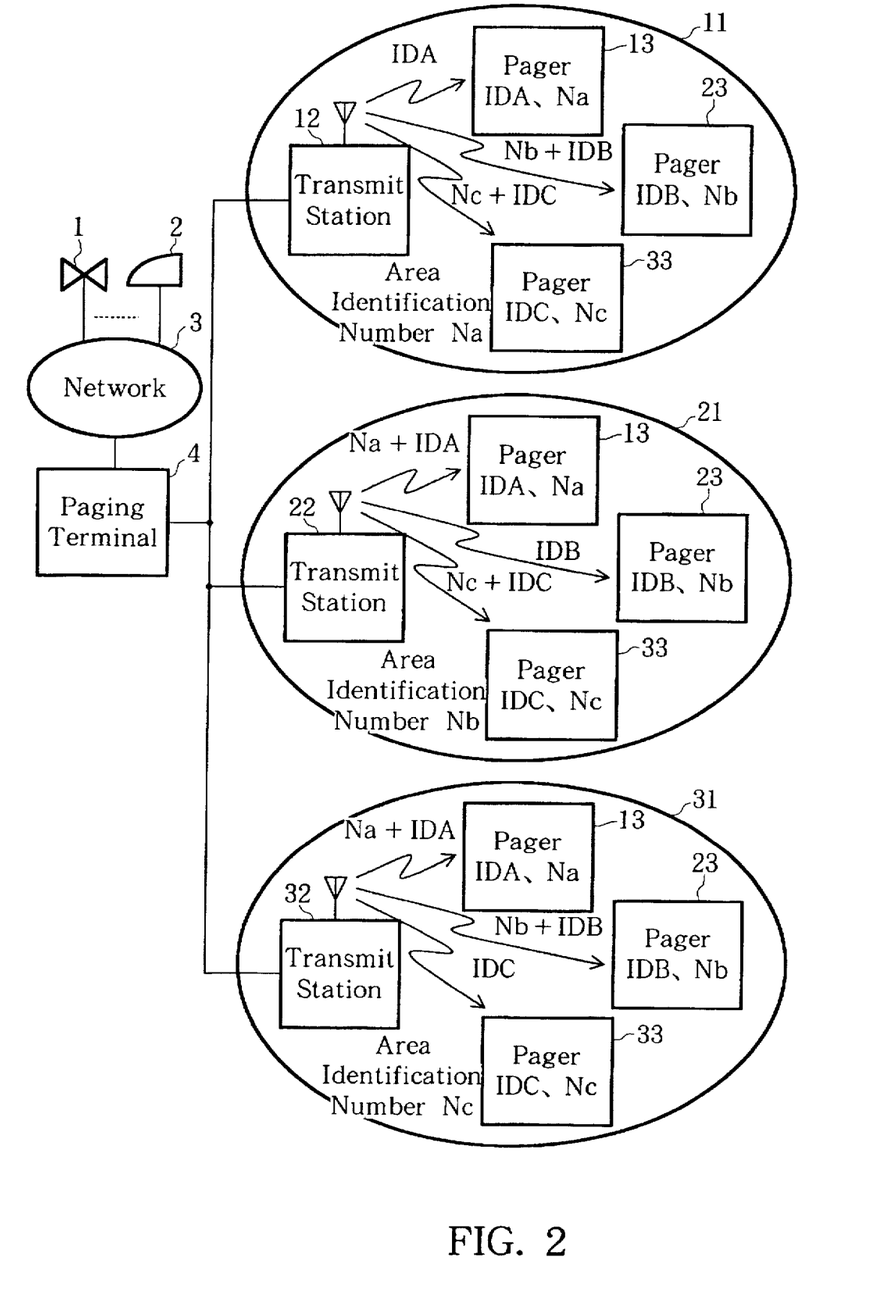
FIG. 2 is a block diagram showing a radio paging system embodying this invention.

FIG. 2 is a block diagram showing a radio paging system according to an embodiment of this invention. In this example, the number of paging areas is taken as three.

Communication terminals 1 and 2 are connected to network 3, to which paging terminal 4 of the radio paging system is also connected. Transmit stations 12, 22 and 32 are connected to paging terminal 4. Transmit stations 12, 22 and 32 form paging areas 11, 21 and 31 respectively, and area identification numbers Na, Nb and Nc are assigned respectively to these paging areas 11, 21 and 31. Addresses IDA, IDB and IDC are respectively given to pagers 13, 23 and 33, the local areas of which are respectively paging areas 11, 21 and 31. These addresses become unique in a given paging area, so that each pager can detect its own paging signals, but because they are given independently in each different paging area, it is not necessarily true that IDA, IDB and IDC are different, and it can be the case that IDA=IDB=IDC.

Transmit stations 12, 22 and 32 transmit radio signals containing paging signals in response to calls arriving from network 3. Pagers 13, 23 and 33 receive the radio signals that have been transmitted by transmit stations 12, 22 and 32, and produce a paging signal output when their own address has been included in these paging signals. Although in this example a single transmit station is provided in each paging area, a plurality of transmit stations can also be provided in a paging area.

It is assumed here that for calls from network 3, in paging area 11 it is transmit station 12 which carries out paging of pager 13 which has this paging area 11 as its local area. When it does so, transmit station 12 transmits, as part of the paging signals, address IDA which is unique to this pager 13. When its own address IDA has been included in a paging signal without any area identification number being included, pager 13 detects this and performs paging.

A similar situation results when pagers 23 and 33, which respectively have paging areas 21 and 31 as their local areas, are paged by transmit stations 22 and 32 in these local areas. In other words, transmit station 22 will page pager 23 using address IDB, and transmit station 32 will page pager 33 using address IDC.

Next, an explanation will be given of the case where pager 13 moves into paging area 21 which is not its local area and is paged within this paging area. In this case, transmit station 22 of this paging area 21 transmits, in the paging signals, the area identification number Na of paging area 11 which is the local area of pager 13, plus address IDA of pager 13. When pager 13 is paged in paging area 21 which is not its local area, it performs paging when it has detected that area identification number Na and address IDA are contained in a paging signal. Here, address IDA may be identical to address IDB of pager 23 which has paging area 21 as its local area. However, because area identification number Na of paging area 11, which is its local area, is transmitted along with address IDA to pager 13, for which paging area 21 is not its local area, pager 23 will not be paged by mistake.

A similar situation results when pager 13 is paged after moving to paging area 31 which is not its local area, when pager 23 is paged after moving to paging areas 11 or 31 which are not its local area, or when pager 33 is paged after moving to paging areas 11 or 21 which are not its local area. In each of these cases, paging is performed by ensuring that the paging signals contain, in addition to the pager address, the area identification number of its local area.

Figure 3:
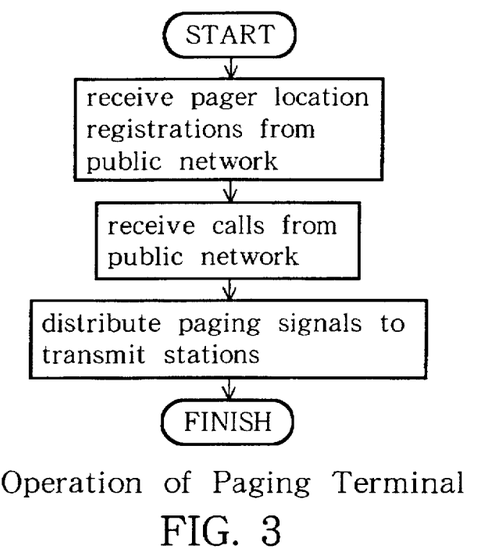
FIG. 3 is a flowchart showing the operation of the paging terminal.
Figure 4:
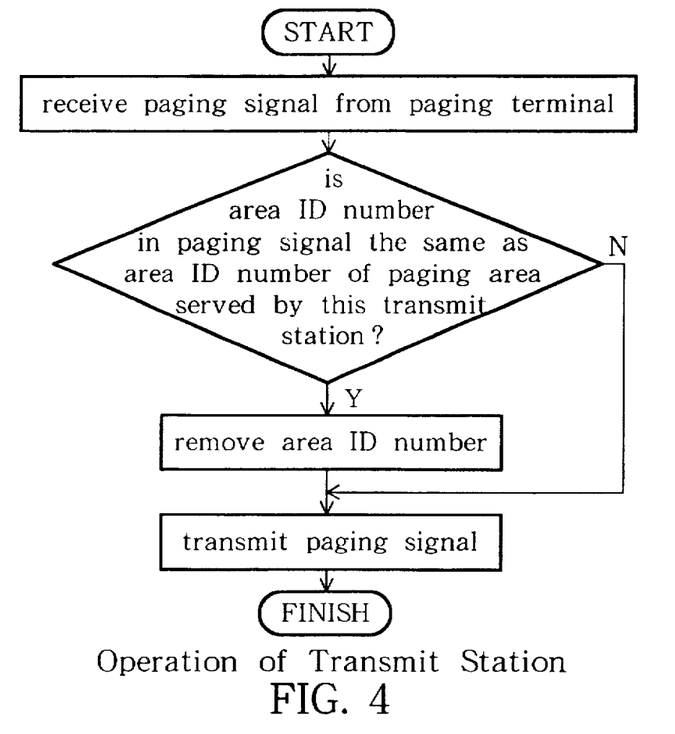
FIG. 4 is a flowchart showing the operation of a transmit station.
Figure 5:
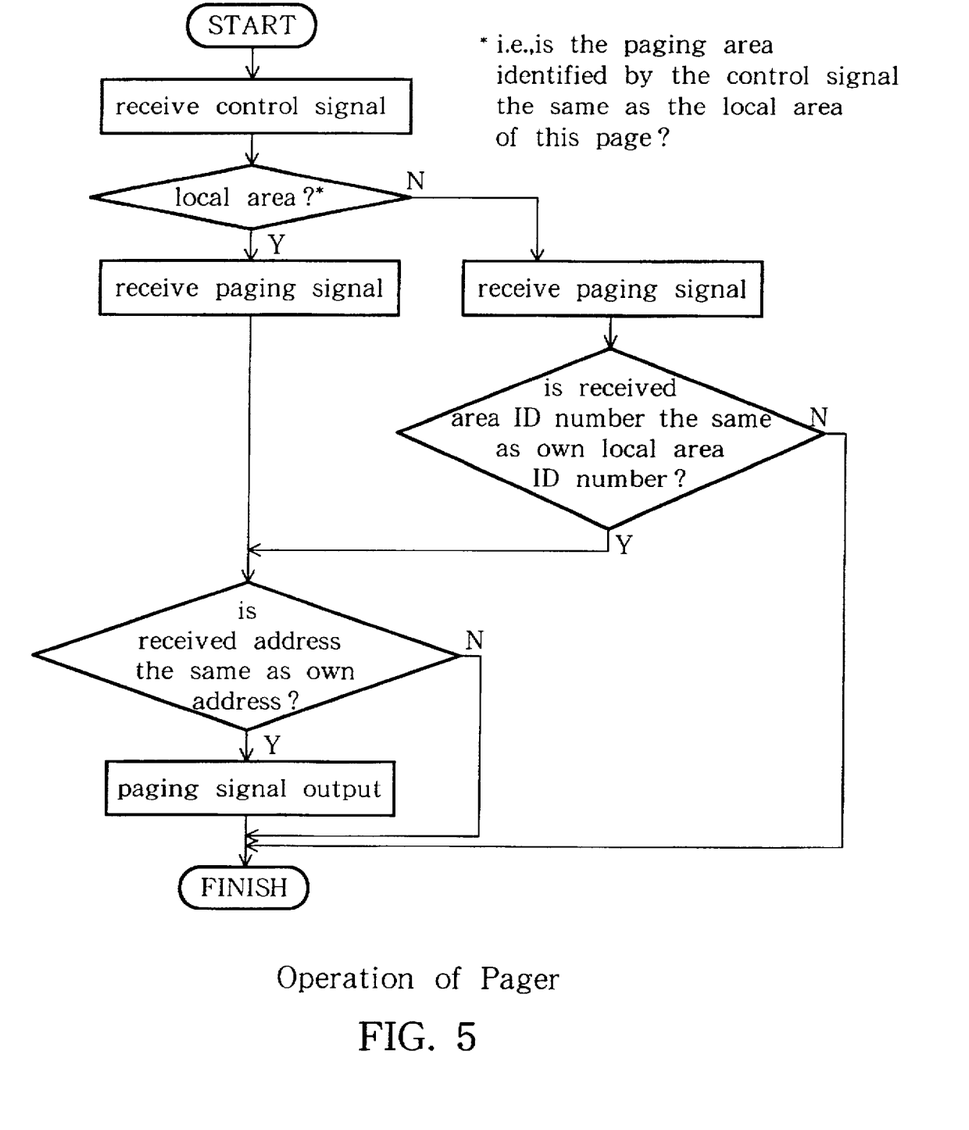
FIG. 5 is a flowchart showing the operation of a pager.

FIG. 3–FIG. 5 are flowcharts showing the respective operations of paging terminal 4, transmit stations 12, 22 and 32, and pagers 13, 23 and 33. The location of each pager is registered with paging terminal 4 via network 3. Paging terminal 4 then transfers calls from network 3 for any given pager to the transmit station serving the registered location of that pager. When it does so, in order to identify the pager being called, paging terminal 4 notifies transmit station 12, 22 or 32 of the address of the pager in question and of the area identification number of its local area. Transmit station 12, 22 or 32 transmits the paging signals from paging terminal 4 after removing the area identification number from any paging signal that contains the area identification number of its own paging area. Transmit station 12, 22 or 32 also transmits, in addition to the paging signals, a control signal for identifying the paging area. Pager 13, 23 or 33 uses these control signals to decide whether or not this paging area is its own local area. When a pager receives a paging signal within its own local area, it produces a paging signal output when it has detected that its own address is contained in that paging signal without the area identification number also being contained therein. When a pager receives a paging signal within another paging area, it produces a paging signal output when it has detected that both the area identification number of its own local area and its own address are contained in that paging signal.

Figure 6:
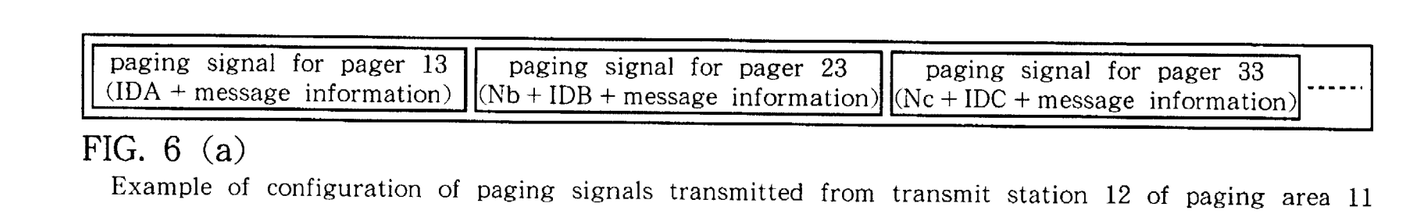
FIGS. 6(a)–(c) shows examples of formats of paging signals transmitted from each transmit station.

FIGS. 6(a)–(c) show examples of the configuration of paging signals, with (a) showing paging signals transmitted from transmit station 12 of paging area 11, (b) showing paging signals transmitted from transmit station 22 of paging area 21, and (c) showing paging signals transmitted from transmit station 32 of paging area 31. In FIG. 6(a), the first paging signal is a paging signal for pager 13, and because this is a paging signal for a pager which has paging area 11 as its local area, it comprises address IDA plus message information. The second and the third paging signals in FIG. 6(a) are paging signals for pagers 23 and 33 respectively, and because they are paging signals for pagers which have other paging areas as their local areas, these second and third paging signals respectively comprise area identification number Nb or Nc of the respective local area, address IDB or IDC, plus message information.

A similar situation is shown in FIG. 6(b) and FIG. 6(c). The three paging signals in FIG. 6(b) are respectively paging signals for pagers 13, 23 and 33 in paging area 21; while the three paging signals in FIG. 6(c) are respectively paging signals for pagers 13, 23 and 33 in paging area 31.

Figure 7:
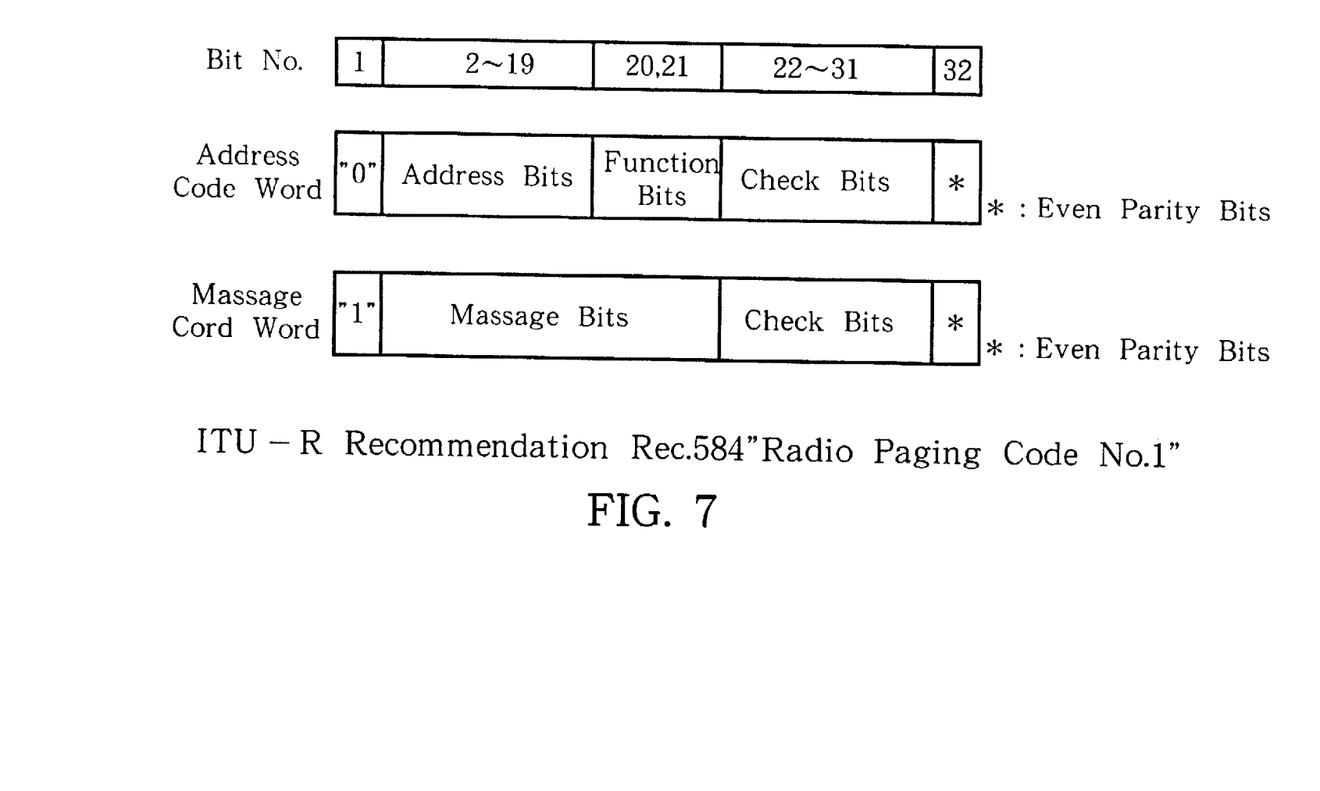
FIG. 7 shows the format of the paging signal given in ITU-R Recommendation Rec.584 "Radio Paging Code No. 1".

The signal given in ITU-R Recommendation Rec.584 "Radio Paging Code No. 1" can be used as the paging signal. The signal format given in "Radio Paging Code No. 1" is shown in FIG. 7. According to "Radio Paging Code No. 1", each code word comprises 32 bits, and these 32 bits comprise BCH (31.21) code consisting of 21 information bits to which 10 check bits have been added, plus an even parity bit. The leading bit of each code word (bit No. 1) serves to identify the type of code word. If this bit is "0", it shows that the code word is an address code word, while if this bit is "1" it shows that the code word is a message code word. In an address code word, the eighteen bits from bit No. 2 to No. 19 are allocated to address bits, while the two bits No. 20 and No. 21 are used as function bits. In a message code word, the twenty bits from bit No. 2 to No. 21 are allocated to message bits.

To utilize this signal format in the present invention, the two function bits are used to distinguish between a paging signal for a pager located in its local area and a paging signal for a pager which has another area as its local area. In a paging signal for a pager located in its local area, the function bits are set to "0, 0". In a paging signal for a pager which has another area as its local area, the function bits are set to "1, 0" in an address code word serving to transmit the area identification number of the local area, and to "1, 1" in an address code word serving to transmit the pager address. These two address code words are then transmitted consecutively. A detailed example of this is illustrated in FIGS. 8(a)–(c).

Figure 8:
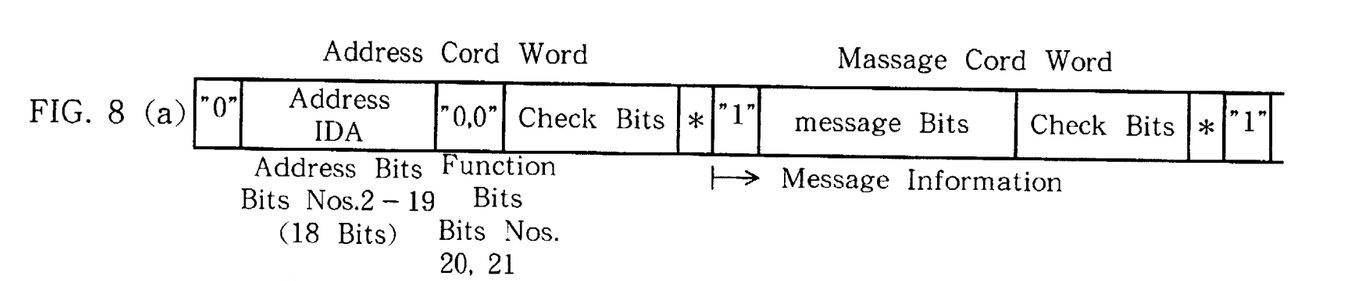
FIGS. 8(a)–(c) shows examples of signal configurations for implementing this invention on the basis of "Radio Paging Code No. 1."

FIG. 8(a) shows a paging signal that is transmitted from transmit station 12 of paging area 11. That is, of the paging signals illustrated in FIG. 6(a), it shows the paging signal for pager 13, which has this paging area 11 as its local area. In this case, the function bits are set to "0, 0" and bits No. 2 to No. 19 are set to address IDA.

Of the paging signals illustrated in FIG. 6(a), FIG. 8(b) shows the paging signal for pager 23 which has other paging area 21 as its local area. In this case, two address code words are used. In the first address code word, the function bits are set to "1, 0" and bits Nos. 2–19 are set to area identification number Nb. In the second address code word, the function bits are set to "1, 1" and bits Nos. 2–19 are set to address IDB.

Of the paging signals illustrated in FIG. 6(a), FIG. 8(c) shows the paging signal for pager 33 which has other paging area 31 as its local area. As in the case of FIG. 8(b), two address code words are used.

The foregoing explanation has concerned the case where the location of a pager to be paged is registered, and only the transmit station corresponding to this location pages the pager in question. When locations are not registered, a given pager will be paged substantially simultaneously from each transmit station. In this case, the signals shown in FIG. 6(a), (b) and (c) will be transmitted simultaneously from the various transmit stations.

As has been explained above, a radio paging system according to this invention enables each pager to be paged in any given paging area without having to be given a separate address for each paging area.

Moreover, even though in each paging area addresses have been given independently to each pager, in any given paging area paging signals for other pagers will not be detected, and it becomes easier to give and manage addresses.

We claim:

1. Radio paging system comprising:

a plurality of transmit stations each of which transmits radio signals containing paging signals to its own respective paging area in response to calls that have arrived from a network; and one or more pagers which receive the radio signals respectively transmitted by said plurality of transmit stations, and each of which produces a paging signal output when it detects that its own address is contained in said paging signals;

wherein an area identification number is assigned to each said paging area;

each of the pagers is set to have one paging area as its local area, and is assigned a unique address in that local area;

each of the transmit stations contains a means which, when it pages a pager which has the paging area of the transmit station as its local area, transmits the address of that pager, and which, when it pages a pager which has another paging area as its local area, transmits the area identification number of the paging area which is the local area of that pager and the address of that pager; and each pager contains a means which, when it receives a paging signal in its own local area, detects that its own address is contained in that paging signal without the accompanying area identification number, and when it receives a paging signal in another paging area, detects that the area identification number of its own local area and its own address are both contained in that paging signal.

2. Radio paging system as set forth in claim 1, wherein:

each of the transmit stations includes a means which transmits, separately from the paging signals, a control signal for identifying its own paging area; and each pager includes a means which decides, on the basis of said control signal, whether or not that paging area is its own local area.

3. Radio paging system as set forth in claim 1 or claim 2, further comprising:

a paging terminal at which the location of each pager is registered via a public network;

wherein the paging terminal includes a means which transfers calls from the network for any given pager to the transmit station serving the location at which said pager is registered.

4. Radio paging system as set forth in claim 3, wherein:

the transferring means includes a means which, in order to identify the pager being called, notifies the transmit station of the address of the pager being called and of the area identification number of its local area; and each of the transmit stations includes a means which removes the area identification number from any paging signal that contains the area identification number of the paging area of the transmit station in operation.

5. Radio paging system as set forth in claim 1, wherein each of the transmit means of each of said transmit stations transmits the address of the pager without the accompanying identification number when the transmit station pages the pager which has the paging area of the transmit station as its local area.

6. A pager of a radio paging system, said radio paging system having a plurality of transmit stations each of which transmits radio signals containing paging signals to its own respective paging area, each paging area having an area identification number assigned thereto, and each of the transmit stations contains a means which, when it pages a pager which has the paging area of the transmit station as its local area, transmits the address of that pager, and which, when it pages a pager which has another paging area as its local area, transmits the area identification number of the paging area which is the local area of that pager and the address of that pager, said pager comprising:

means for producing an output when the pager detects that its own address is contained in the paging signal; and means for, when it receives the paging signal in the pager's own local area, detecting that its own address is contained in that paging signal without the accompanying area identification number, and when it receives the paging signal in another paging area, detecting that the area identification number of its own local area and its own address are both contained in that paging signal.

7. Pager as set forth in claim 6, further comprising:

a means for deciding, on the basis of a control signal transmitted from said transmit stations separately from the paging signals, whether or not that paging area is its own local area.

\* \* \* \* \*